(12) United States Patent
Kim et al.

(10) Patent No.: US 10,796,493 B2
(45) Date of Patent: Oct. 6, 2020

(54) APPARATUS AND METHOD FOR CALIBRATING AUGMENTED-REALITY IMAGE

(71) Applicant: ELECTRONICS AND TELECOMMUNICATIONS RESEARCH INSTITUTE, Daejeon (KR)

(72) Inventors: Jae-Hean Kim, Sejong (KR); Bon-Ki Koo, Daejeon (KR); Chang-Joon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/447,847

(22) Filed: Jun. 20, 2019

(65) Prior Publication Data
US 2020/0005543 A1 Jan. 2, 2020

(30) Foreign Application Priority Data
Jul. 2, 2018 (KR) ........................ 10-2018-0076565

(51) Int. Cl.
*G06T 19/00* (2011.01)
*G06F 3/01* (2006.01)
*G06T 7/73* (2017.01)

(52) U.S. Cl.
CPC ............ *G06T 19/006* (2013.01); *G06F 3/011* (2013.01); *G06T 7/73* (2017.01)

(58) Field of Classification Search
None
See application file for complete search history.

(56) References Cited

U.S. PATENT DOCUMENTS

| 6,753,828 | B2 | 6/2004 | Tuceryan et al. | |
|---|---|---|---|---|
| 2010/0045701 | A1* | 2/2010 | Scott | G01S 5/163 345/633 |
| 2013/0141593 | A1* | 6/2013 | Bassi | H04N 9/3147 348/188 |
| 2015/0138235 | A1 | 5/2015 | Cho et al. | |
| 2016/0364911 | A1 | 12/2016 | Jo et al. | |

(Continued)

FOREIGN PATENT DOCUMENTS

| KR | 100248374 B1 | 3/2000 |
|---|---|---|
| KR | 101559012 B1 | 10/2015 |
| KR | 101583131 B1 | 1/2016 |

OTHER PUBLICATIONS

Janin, Adam L., David W. Mizell, and Thomas P. Caudell. "Calibration of head-mounted displays for augmented reality applications." Proceedings of IEEE Virtual Reality Annual International Symposium. IEEE, 1993.*

(Continued)

*Primary Examiner* — Ryan M Gray

(57) ABSTRACT

Disclosed herein are an apparatus and method for calibrating an augmented-reality image. The apparatus includes a camera unit for capturing an image and measuring 3D information pertaining to the image, an augmented-reality image calibration unit for generating an augmented-reality image using the image and the 3D information and for calibrating the augmented-reality image, and a display unit for displaying the augmented-reality image.

14 Claims, 6 Drawing Sheets

(56) References Cited

U.S. PATENT DOCUMENTS

2017/0154471 A1* 6/2017 Woo .......................... G06T 7/11
2018/0101989 A1* 4/2018 Frueh ...................... G06T 15/04
2018/0295353 A1* 10/2018 Lee ...................... H04N 13/239
2019/0171286 A1* 6/2019 Melman .................. G06F 3/013
2020/0042278 A1* 2/2020 Eade ...................... G09G 3/003

OTHER PUBLICATIONS

Ferrari, Vittorio, Tinne Tuytelaars, and Luc Van Gool. "Markerless augmented reality with a real-time affine region tracker." Proceedings IEEE and ACM International Symposium on Augmented Reality. IEEE, 2001.*

Yakup Genc et al., "Optical See-Through Calibration with Vision-Based Trackers: Propagation of Projection Matrices," Proceedings of the IEEE and ACM International Symposium on Augmented Reality, Oct. 2001, pp. 147-156.

Kenneth R Moser et al., "Evaluation of User-Centric Optical See-Through Head-Mounted Display Calibration Using a Leap Motion Controller," Proceedings of IEEE Symposium on 3D User Interfaces, Mar. 2016, pp. 159-167.

* cited by examiner

APPARATUS AND METHOD FOR CALIBRATING AUGMENTED-REALITY IMAGE

CROSS REFERENCE TO RELATED APPLICATION

This application claims the benefit of Korean Patent Application No. 10-2018-0076565, filed Jul. 2, 2018, which is hereby incorporated by reference in its entirety into this application.

BACKGROUND OF THE INVENTION

1. Technical Field

The present invention relates generally to augmented-reality technology, and more particularly to technology for calibrating an augmented-reality image.

2. Description of the Related Art

Augmented reality is a technology that superimposes a virtual object on a user's view of the real world. In order to implement augmented reality, it must be possible to continuously measure the three-dimensional (3D) position and orientation of an observer in the real world and 3D information about real-world objects in real time. Accordingly, an augmented reality (AR) device requires a sensor that is capable of continuously tracking the 3D position and orientation of the AR device and 3D information about real-world objects. Recently, the number of types of devices that perform tracking using their cameras as sensors has increased. In order to output augmented-reality images, two methods may be used. The first method is a video see-through method, in which a virtual object is combined with an image input from a camera and is then output via a display. The second method is an optical see-through method, in which a direct view of the real world is provided to a user through a transparent display and a virtual object is overlaid thereon. Here, because a tracking camera performs 3D tracking from the viewpoint thereof, 3D information from the viewpoint of an observer is not provided. In this regard, the video see-through method has no problem when the tracking camera is the same camera used to capture the real-world image. However, when the tracking camera is different from the camera used to capture the real-world image, an offset between the two cameras may be caused. In the case of the optical see-through method, an offset between the eyes of an observer and a tracking camera may be caused. If such an offset is not calibrated, an overlaid virtual object may also have an offset, which reduces the realism of an augmented-reality image. There are various methods for calibrating such an offset, but the existing methods are inconvenient, and thus it is necessary to develop a more convenient method.

Meanwhile, Korean Patent No. 10-1559012, titled "Apparatus for calibrating augmented-reality head-up display image and method thereof" discloses an apparatus and method for calibrating an augmented-reality head-up display image, in which a head-up display image implemented using augmented reality is output so as to match the view of a driver by transforming the coordinates of the position of the head-up display image.

SUMMARY OF THE INVENTION

An object of the present invention is to provide a realistic augmented-reality image to users.

Another object of the present invention is to enable a user of an augmented-reality image device to easily calibrate an augmented-reality image.

A further object of the present invention is to effectively calibrate an augmented-reality image using hand gestures or a simple motion of a user without the use of a special calibration tool.

In order to accomplish the above objects, an apparatus for calibrating an augmented-reality image according to an embodiment of the present invention includes a camera unit for capturing an image and measuring 3D information pertaining to the image; an augmented-reality image calibration unit for generating an augmented-reality image using the image and the 3D information and calibrating the augmented-reality image; and a display unit for displaying the augmented-reality image.

Here, the camera unit may select a feature point in the image and extract the 3D coordinates of the feature point.

Here, the augmented-reality image calibration unit may generate a patch, which is a predetermined range surrounding the feature point cut from the image.

Here, the augmented-reality image calibration unit may generate the patch, which includes a marker line for indicating the position of the feature point.

Here, the augmented-reality image calibration unit may display the image on which the patch is overlaid at an arbitrary position through the display unit.

Here, the augmented-reality image calibration unit may fix the patch at the arbitrary position and perform a matching process for generating calibration information including the 2D coordinates of the patch and the 3D coordinates of the feature point when a part of the image overlaps the same part in the patch depending on the movement of a user.

Here, the augmented-reality image calibration unit may generate multiple patches and perform the matching process for the multiple patches, thereby generating the calibration information.

Here, the augmented-reality image calibration unit may calculate a calibration relationship between the 2D coordinates of the patch and the 3D coordinates of the feature point using the calibration information.

Here, the augmented-reality image calibration unit may calculate the calibration relationship using the calibration information, a first relationship between the reference coordinate system of the camera unit and the reference coordinate system of the user, and a second relationship between the reference coordinate system of the display unit and the reference coordinate system of the user.

Here, the augmented-reality image calibration unit may transform the 3D coordinates of a virtual object in a 3D space into the 2D coordinates using the calibration relationship and display the augmented-reality image including the virtual object through the display unit.

Also, in order to accomplish the above objects, a method for calibrating an augmented-reality image, performed by an apparatus for calibrating the augmented-reality image, includes capturing, by a camera unit, an image, and measuring, by the camera unit, 3D information pertaining to the image; generating, by an augmented-reality image calibration unit, an augmented-reality image using the image and the 3D information, and calibrating, by the augmented-reality image calibration unit, the augmented-reality image; and displaying, by a display unit, the augmented-reality image.

Here, measuring the 3D information may be configured to select a feature point in the image and extract the 3D coordinates of the feature point.

Here, calibrating the augmented-reality image may be configured to generate a patch that is a predetermined range surrounding the feature point cut from the image.

Here, calibrating the augmented-reality image may be configured to generate the patch that includes a marker line for indicating the position of the feature point.

Here, calibrating the augmented-reality image may be configured to display the image on which the patch is overlaid at an arbitrary position through the display unit.

Here, calibrating the augmented-reality image may be configured to fix the patch at the arbitrary position and perform a matching process for generating calibration information including the 2D coordinates of the patch and the 3D coordinates of the feature point when a part of the image overlaps the same part in the patch depending on the movement of a user.

Here, calibrating the augmented-reality image may be configured to generate multiple patches and perform the matching process for the multiple patches, thereby generating the calibration information.

Here, calibrating the augmented-reality image may be configured to calculate a calibration relationship between the 2D coordinates of the patch and the 3D coordinates of the feature point using the calibration information.

Here, calibrating the augmented-reality image may be configured to calculate the calibration relationship using the calibration information, a first relationship between the reference coordinate system of the camera unit and the reference coordinate system of the user, and a second relationship between the reference coordinate system of the display unit and the reference coordinate system of the user.

Here, calibrating the augmented-reality image may be configured to transform the 3D coordinates of a virtual object in a 3D space into the 2D coordinates using the calibration relationship and to display the augmented-reality image including the virtual object through the display unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
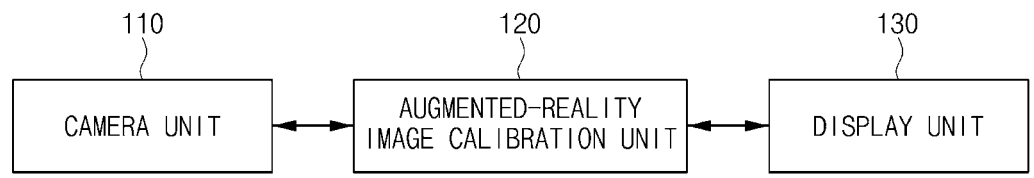
FIG. 1 is a block diagram that shows an apparatus for calibrating an augmented-reality image according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 2:
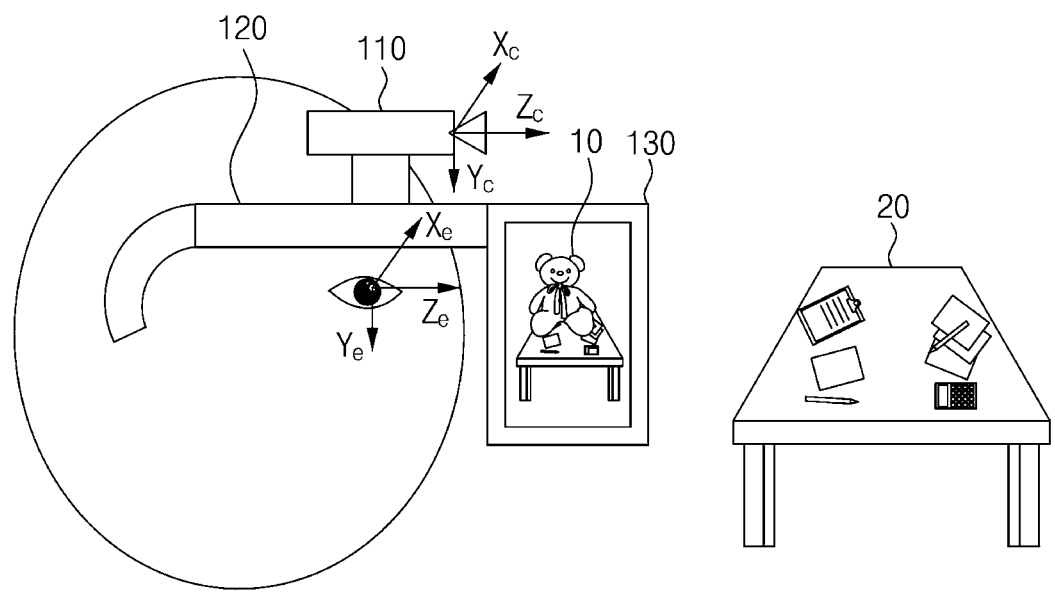
FIG. 2 is a view that shows calibration of an augmented-reality image according to an embodiment of the present invention.
Figure 3:
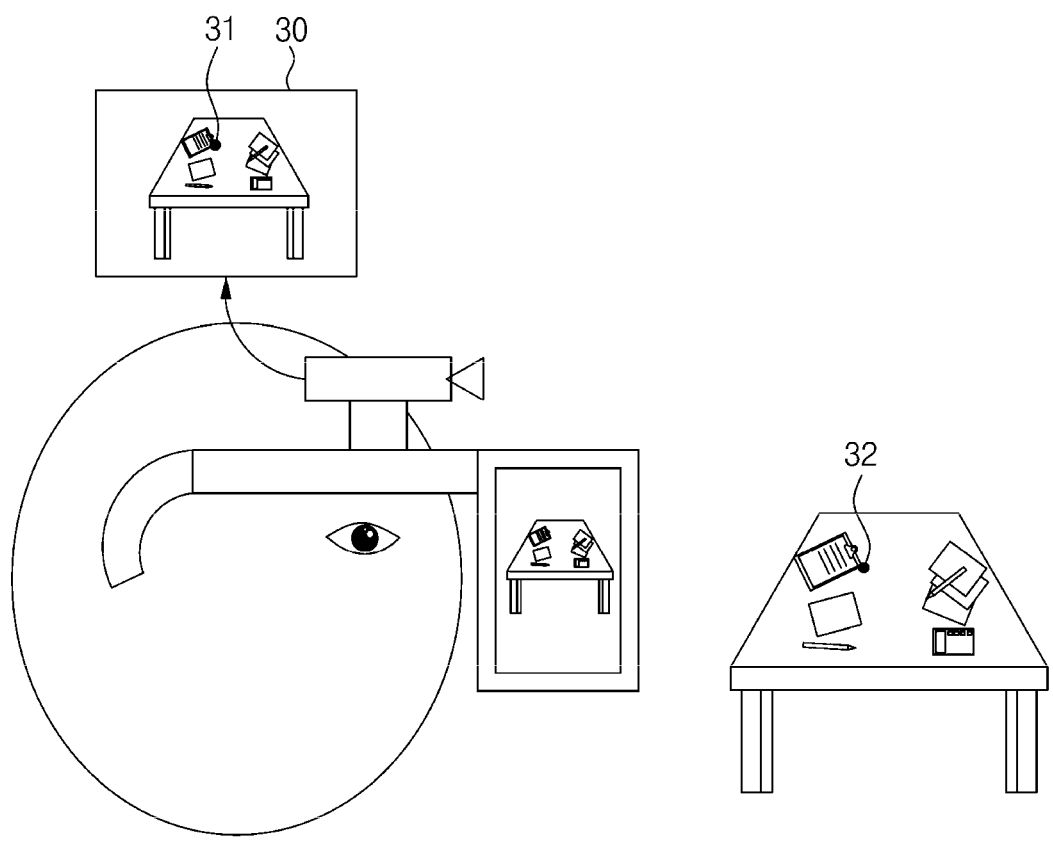
FIG. 3 is a view that shows extraction of a feature point in the process of calibrating an augmented-reality image according to an embodiment of the present invention.
Figure 4:
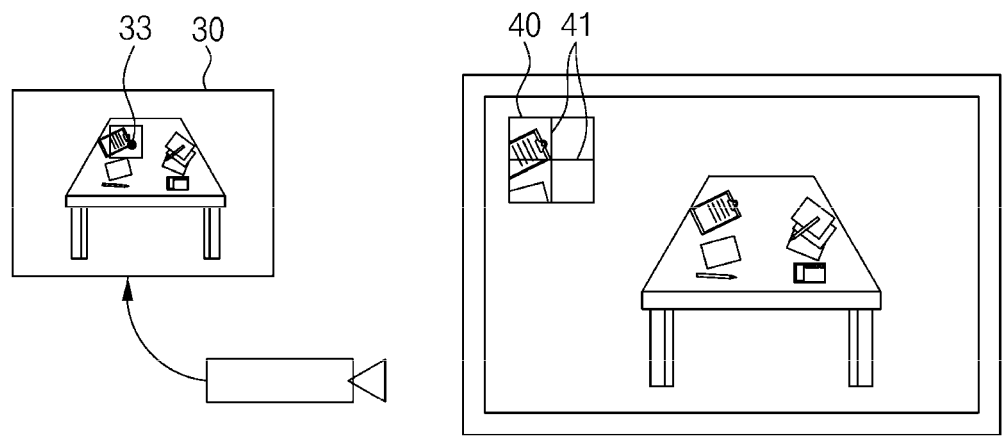
FIG. 4 is a view that shows the generation of a patch in the process of calibrating an augmented-reality image according to an embodiment of the present invention.
Figure 5:
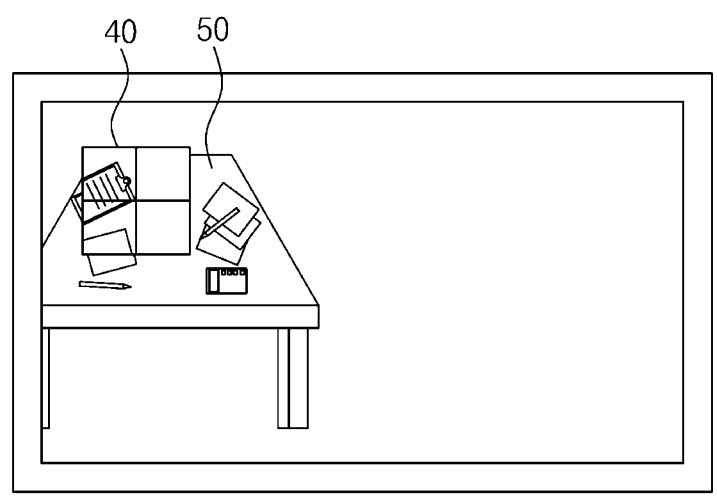
FIG. 5 is a view that shows that a patch matches a background in the process of calibrating an augmented-reality image according to an embodiment of the present invention.
Figure 6:
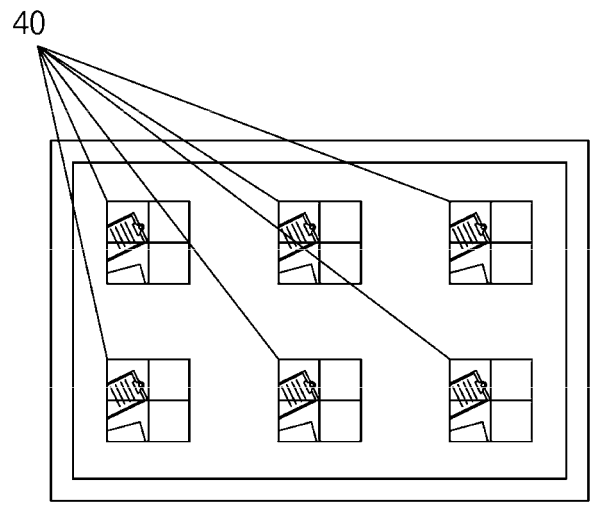
FIG. 6 is a view that shows the process of matching a patch with a background in the process of calibrating an augmented-reality image according to an embodiment of the present invention.
Figure 7:
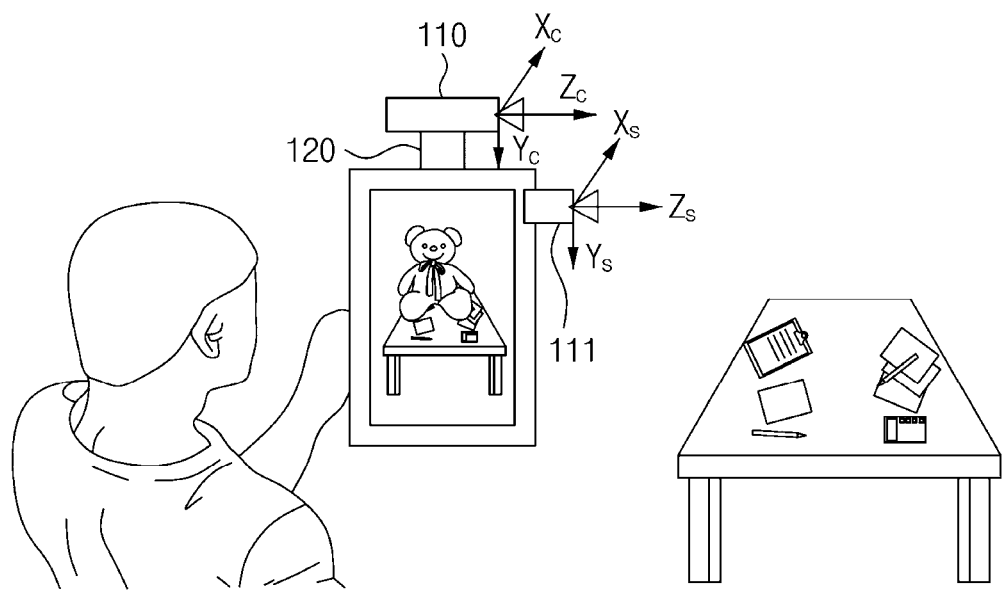
FIG. 7 is a view that shows an apparatus for calibrating an augmented-reality image based on a see-through method according to an embodiment of the present invention.

FIG. 1 is a block diagram that shows an apparatus for calibrating an augmented-reality image according to an embodiment of the present invention. FIG. 2 is a view that shows calibration of an augmented-reality image according to an embodiment of the present invention. FIG. 3 is a view that shows extraction of a feature point in the process of calibrating an augmented-reality image according to an embodiment of the present invention. FIG. 4 is a view that shows the generation of a patch in the process of calibrating an augmented-reality image according to an embodiment of the present invention. FIG. 5 is a view that shows that a patch matches a background in the process of calibrating an augmented-reality image according to an embodiment of the present invention. FIG. 6 is a view that shows the process of matching a patch with a background in the process of calibrating an augmented-reality image according to an embodiment of the present invention. FIG. 7 is a view that shows an apparatus for calibrating an augmented-reality image based on a see-through method according to an embodiment of the present invention.

Referring to FIG. 1, the apparatus for calibrating an augmented-reality image according to an embodiment of the present invention includes a camera unit 110, an augmented-reality image calibration unit 120, and a display unit 130.

Here, the apparatus for calibrating an augmented-reality image may be an optical see-through Head-Mounted Display (HMD) device or a video see-through augmented-reality image device.

Referring to FIG. 2, the camera unit 110 may capture an image and measure 3D information pertaining to the image.

Here, when the apparatus for calibrating an augmented-reality image is a video see-through augmented-reality image device, the apparatus may further include a built-in camera 111 for combining a 3D virtual object and capturing an image.

Here, the camera unit 110 may capture the image of an arbitrary scene that a user views.

Here, the camera unit 110 may calculate the position of the camera unit 110 relative to the 3D position of an object, which is measured in the image, using camera image information.

Here, the camera unit 110 may represent the 3D coordinates of the object based on the reference coordinate system $X_c Y_c Z_c$ of the camera unit 110. Here, the reference coordinate system of the user, which is based on the eye of the user, is represented as $X_e Y_e Z_e$.

Referring to FIG. 3, the camera unit 110 may select a feature point in the image and extract the 3D coordinates of the feature point.

Here, any point based on which tracking may be reliably performed even when the view is moved due to the movement of the camera unit 110 may be selected as the feature point.

Here, the camera unit 110 may use any of various feature point extraction methods, such as Kanade-Lucas-Tomasi (KLT), Scale-Invariant Feature Transform (SIFT), Speeded-Up Robust Features (SURF), Oriented FAST and Rotated BRIEF (ORB), and the like, which are commonly used by experts in the computer vision field.

Here, when the camera unit 110 is a stereo camera, the point corresponding to a feature point that is extracted from any one of the two cameras in the stereo camera may be calculated using a triangulation method. Alternatively, the 3D-coordinate values of a feature point may be measured from the depth thereof using a depth sensor, or a feature point may be extracted using any of various methods, such as simultaneous localization and mapping (SLAM), structure from motion (SFM), and the like.

The augmented-reality image calibration unit 120 may generate an augmented-reality image using the image and the 3D information and calibrate the augmented-reality image.

Referring to FIG. 4, the augmented-reality image calibration unit 120 may generate a patch, which is a predetermined range surrounding the feature point cut from the image.

Here, the augmented-reality image calibration unit 120 may generate a patch that includes a marker line for indicating the position of the feature point.

Here, the augmented-reality image calibration unit 120 may display the image on which the patch is overlaid at an arbitrary position through the display unit 130.

Here, a user may view both the patch and the actual background of the image through the display unit 130, and may move the apparatus for calibrating an augmented-reality image such that the feature point in the patch matches the feature point in the actual background.

Referring to FIG. 5, the augmented-reality image calibration unit 120 may fix the patch at an arbitrary position, and may perform a matching process for generating calibration information including the 2D coordinates of the patch and the 3D coordinates of the feature point when a part of the patch overlaps the same part in the image depending on the movement of the user.

Here, the camera unit 110 may continuously track the feature point while the apparatus for calibrating an augmented-reality image is moving, and may measure the 3D coordinates of the feature point.

Here, the camera unit 110 may store the measured 3D coordinates in the augmented-reality image calibration unit 120.

Referring to FIG. 6, the augmented-reality image calibration unit 120 may generate multiple patches and perform the matching process for the multiple patches, thereby generating calibration information.

For example, when the augmented-reality image calibration unit 120 generates at least six patches, it is necessary to perform the matching process at least six times. Here, the augmented-reality image calibration unit 120 may sequentially display the respective patches through the display unit 130 and perform the matching process for each of the patches, thereby generating calibration information.

Here, in order to perform the matching process N times, the augmented-reality image calibration unit 120 may represent the 2D coordinates of each patch as [xi, yi] (where i=1, N), and may represent the 3D coordinates of the feature point, which are calculated by performing the matching process for each patch, as [Xi, Yi, Zi] (where i=1, ..., N).

Here, the augmented-reality image calibration unit 120 may perform the calibration process using the same method as the above-mentioned camera calibration method, which is well-known in the computer vision field.

Also, the augmented-reality image calibration unit 120 may calculate a calibration relationship between the 2D coordinates of the patch and the 3D coordinates of the feature point using the calibration information.

Here, the calibration relationship may be represented as shown in Equation (1):

$$[x_i y_i 1]^T \approx P[X_i Y_i Z_i 1]^T \qquad (1)$$

where P denotes a 3×4 matrix, and means that the ratio between vector elements is the same.

Here, the augmented-reality image calibration unit 120 may calculate P using Equation (1) based on the well-known Direct Linear Transform (DLT) method.

Here, in order to improve the precision of P, the augmented-reality image calibration unit 120 may take the calculated P as an initial value and use the cost function shown in Equation (2), thereby calculating P using a nonlinear optimization method.

$$\sum_{i=0}^{N} \|[x_i y_i]^T - \pi(P[X_i Y_i Z_i 1]^T)\|^2 \qquad (2)$$

In Equation (2), the function defined as $\pi([a\ b\ c]^T) = [a/c\ b/c]^T$ used.

Here, the augmented-reality image calibration unit 120 applies the well-known QR decomposition to P, which is calculated using Equation (2), and uses a simple matrix operation, thereby representing P as shown in Equation (3):

$$P \approx K[RT] \qquad (3)$$

Here, the augmented-reality image calibration unit 120 may calculate the calibration relationship using the calibration information, a first relationship between the reference coordinate system of the camera unit 110 and the reference coordinate system of the user, and a second relationship between the reference coordinate system of the display unit 130 and the reference coordinate system of the user.

Here, when the apparatus for calibrating an augmented-reality image is a video see-through augmented-reality image device, the augmented-reality image calibration unit 120 may calculate the calibration relationship using the calibration information, a first relationship between the reference coordinate system of the camera unit 110 and that of the built-in camera unit 111, and a second relationship between the reference coordinate system of the display unit 130 and that of the built-in camera unit 111.

Referring to Equation (3), the first relationship between the reference coordinate system of the camera unit 110 and the reference coordinate system of the user or the built-in camera unit 111 is represented using a rotation matrix R and a transition vector T. Also, the second relationship between the reference coordinate system of the display unit 130 and the reference coordinate system of the user or the built-in camera unit 111 is represented using a variable K.

Here, the calibration relationship, through which the augmented-reality image calibration unit 120 may transform the 3D coordinates [X Y Z] of the 3D virtual object represented in the reference coordinate system of the camera unit 110 into the 2D position [x y] in the display unit 130 of the user using P, may be represented as shown in Equation (4):

$$[xy1]^T \approx P[XYZ1]^T \qquad (4)$$

Here, the augmented-reality image calibration unit 120 may transform the 3D coordinates of the 3D virtual object into the 2D coordinates using the calibration relationship, and may then display the augmented-reality image including the virtual object through the display unit 130.

The display unit 130 may display the augmented-reality image.

The feature point used for the calibration process may be changed every time the matching process is performed, or the same feature point may be repeatedly used. However, the greater the variety of the 3D depth value of the feature point, the higher the stability of the calculation result. Accordingly, the user who wears the apparatus for calibrating an augmented-reality image may perform the matching process for each of the patches while moving back and forth, or may use feature points having different depths by extracting the same in the matching process.

Because the apparatus for calibrating an augmented-reality image may include a binocular display, the above-described process may be performed for each of the displays comprising the binocular display.

FIG. 7 shows an example in which a method for calibrating an augmented-reality image according to an embodiment of the present invention is based on an augmented-reality image calibration method of a video see-through augmented-reality image device.

Here, the apparatus for calibrating an augmented-reality image may further include a built-in camera unit 111.

Here, the built-in camera unit 111 may combine a virtual object with a captured image and display the composite image through the display unit 130.

Here, if the built-in camera unit 111 is capable of measuring the 3D position and orientation of the apparatus for calibrating an augmented-reality image and the 3D information of a background by itself, the above-described process for calibrating an augmented-reality image is not necessary. However, when the camera unit 110 used as an auxiliary device measures the 3D information of the image, the above-described calibration process is required. The calibration process may be the same as that performed by the optical see-through HMD device, but may be different in that, when the image captured by the camera unit 110 and the patch are combined and displayed through the display unit 130, the patch is made translucent in order to show the patch and the actual background at the same time even though they overlap.

The calibration relationship in the video see-through method may correspond to the first relationship between the reference coordinate system $X_c Y_c Z_c$ of the camera unit 110 and the reference coordinate system $X_s Y_s Z_s$ of the built-in camera unit 111 and the second relationship between the reference coordinate system of the built-in camera unit 111 and that of the display unit 130.

Figure 8:
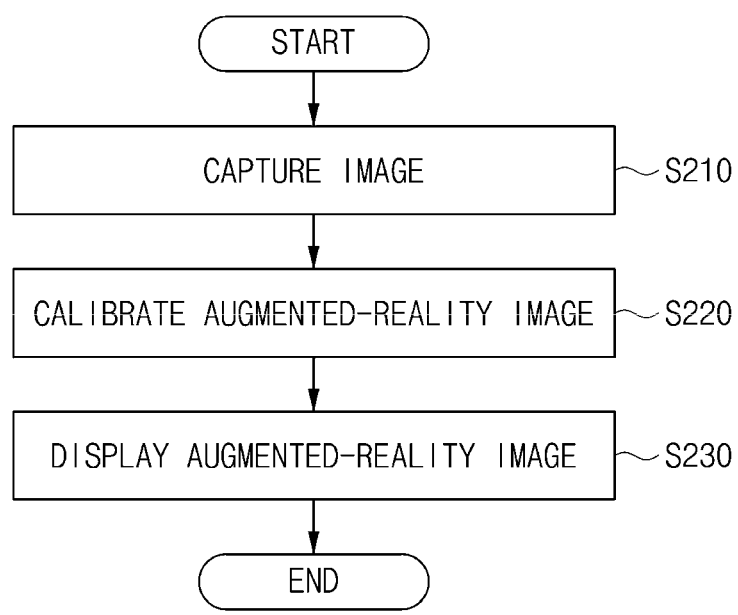
FIG. 8 is a flowchart that shows a method for calibrating an augmented-reality image according to an embodiment of the present invention.

FIG. 8 is a flowchart that shows a method for calibrating an augmented-reality image according to an embodiment of the present invention.

Referring to FIG. 8, in the method for calibrating an augmented-reality image according to an embodiment of the present invention, first, an image may be captured at step S210.

That is, at step S210, an image may be captured, and 3D information about the image may be measured.

Here, at step S210, the image of an arbitrary scene that a user views may be captured.

Here, at step S210, the position of the camera unit 110 relative to the 3D position of the object, which is measured in the image, may be calculated using the camera image information.

Here, at step S210, the 3D coordinates of the object may be represented based on the reference coordinate system $X_c Y_c Z_c$ of the camera unit 110. Here, the reference coordinate system of the user, which is based on the eye of the user, is represented as $X_e Y_e Z_e$.

Here, at step S210, a feature point may be selected in the image, and the 3D coordinates of the feature point may be extracted.

Here, any point based on which tracking may be reliably performed even when the view is moved due to the movement of the camera unit 110 may be selected as the feature point.

Here, at step S210, any of various feature point extraction methods, including Kanade-Lucas-Tomasi (KLT), Scale-Invariant Feature Transform (SIFT), Speeded-Up Robust Features (SURF), Oriented FAST and Rotated BRIEF (ORB), and the like, which are commonly used by experts in the computer vision field, may be used.

Here, at step S210, when a stereo camera is used, a point corresponding to a feature point extracted from any one of the two cameras in the stereo camera may be calculated using a triangulation method. Alternatively, the 3D-coordinate values of a feature point may be measured from the depth thereof using a depth sensor, or a feature point may be extracted using any of various methods, such as simultaneous localization and mapping (SLAM), structure from motion (SFM), and the like.

Also, in the method for calibrating an augmented-reality image according to an embodiment of the present invention, an augmented-reality image may be calibrated at step S220.

That is, at step S220, an augmented-reality image is generated using the image and the 3D information, and the augmented-reality image may be calibrated.

Here, at step S220, a patch may be generated by cutting a predetermined range surrounding the feature point from the image.

Here, at step S220, a patch that includes a marker line for indicating the position of the feature point may be generated.

Here, at step S220, the image on which the patch is overlaid at an arbitrary position may be displayed through the display unit 130.

Here, a user may view both the patch and the actual background of the image through the display unit 130, and may move the apparatus for calibrating an augmented-reality image such that the feature point in the patch matches the feature point in the actual background.

Also, at step S220, the patch is fixed at an arbitrary position, and a matching process for generating calibration information, including the 2D coordinates of the patch and the 3D coordinates of the feature point when a part of the patch overlaps the same part in the image depending on the movement of the user, may be performed.

Here, at step S220, the feature point may be continuously tracked while the apparatus for calibrating an augmented-reality image is moving, and the 3D coordinates of the feature point may be measured.

Here, at step S220, the measured 3D coordinates may be stored in the augmented-reality image calibration unit 120.

Also, at step S220, multiple patches may be generated, and the matching process may be performed for the multiple patches, whereby calibration information may be generated.

For example, at step S220, when at least six patches are generated, it is necessary to perform the matching process at least six times. Here, the respective patches may be sequentially displayed through the display unit 130, and the matching process may be performed for each of the patches, whereby calibration information may be generated.

Here, in order to perform the matching process N times, the augmented-reality image calibration unit 120 may represent the 2D coordinates of each patch as [xi, yi] (where i=1, . . . , N), and may represent the 3D coordinates of the feature point, which are calculated by performing the matching process for each patch, as [Xi, Yi, Zi] (where i=1, . . . , N).

Here, at step S220, the calibration process may be performed using the same method as the above-mentioned camera calibration method, which is well-known in the computer vision field.

Also, at step S220, a calibration relationship between the 2D coordinates of the patch and the 3D coordinates of the feature point may be calculated using the calibration information.

Here, the calibration relationship may be represented as shown in Equation (1).

In Equation (1), P denotes a 3×4 matrix, and means that the ratio between vector elements is the same.

Here, at step S220, P may be calculated using Equation (1) based on the well-known Direct Linear Transform (DLT) method.

Here, at step S220, in order to improve the precision of P, the cost function shown in FIG. 2, in which the calculated P is set as an initial value, may be used, whereby P may be calculated using a nonlinear optimization method.

In equation (2), the function defined as $\pi([a\ b\ c]^T)=[a/c\ b/c]^T$ is used.

Here, at step S220, when the well-known QR decomposition is applied to P, which is calculated using Equation (2), using a simple matrix operation, P may be represented as shown in Equation (3).

Here, at step S220, the calibration relationship may be calculated using the calibration information, a first relationship between the reference coordinate system of the camera unit 110 and the reference coordinate system of the user, and a second relationship between the reference coordinate system of the display unit 130 and the reference coordinate system of the user.

Here, at step S220, when the apparatus for calibrating an augmented-reality image is a video see-through augmented-reality image device, the calibration relationship may be calculated using the calibration information, a first relationship between the reference coordinate system of the camera unit 110 and that of the built-in camera unit 111, and a second relationship between the reference coordinate system of the display unit 130 and that of the built-in camera unit 111.

Referring to Equation (3), the first relationship between the reference coordinate system of the camera unit 110 and that of the user or the built-in camera unit 111 is represented using a rotation matrix R and a transition vector T. The second relationship between the reference coordinate system of the display unit 130 and that of the user or the built-in camera unit 111 is represented as a variable K.

Here, at step S220, the calibration relationship, through which the 3D coordinates [X Y Z] of the 3D virtual object represented in the reference coordinate system of the camera unit 110 are transformed into the 2D position [x y] in the display unit 130 of the user using P, may be represented as shown in Equation (4).

Here, at step S220, the 3D coordinates of the 3D virtual object may be transformed into the 2D coordinates using the calibration relationship, and the augmented-reality image including the virtual object may be displayed through the display unit 130.

Also, in the method for calibrating an augmented-reality image according to an embodiment of the present invention, the augmented-reality image may be displayed at step S230.

Figure 9:
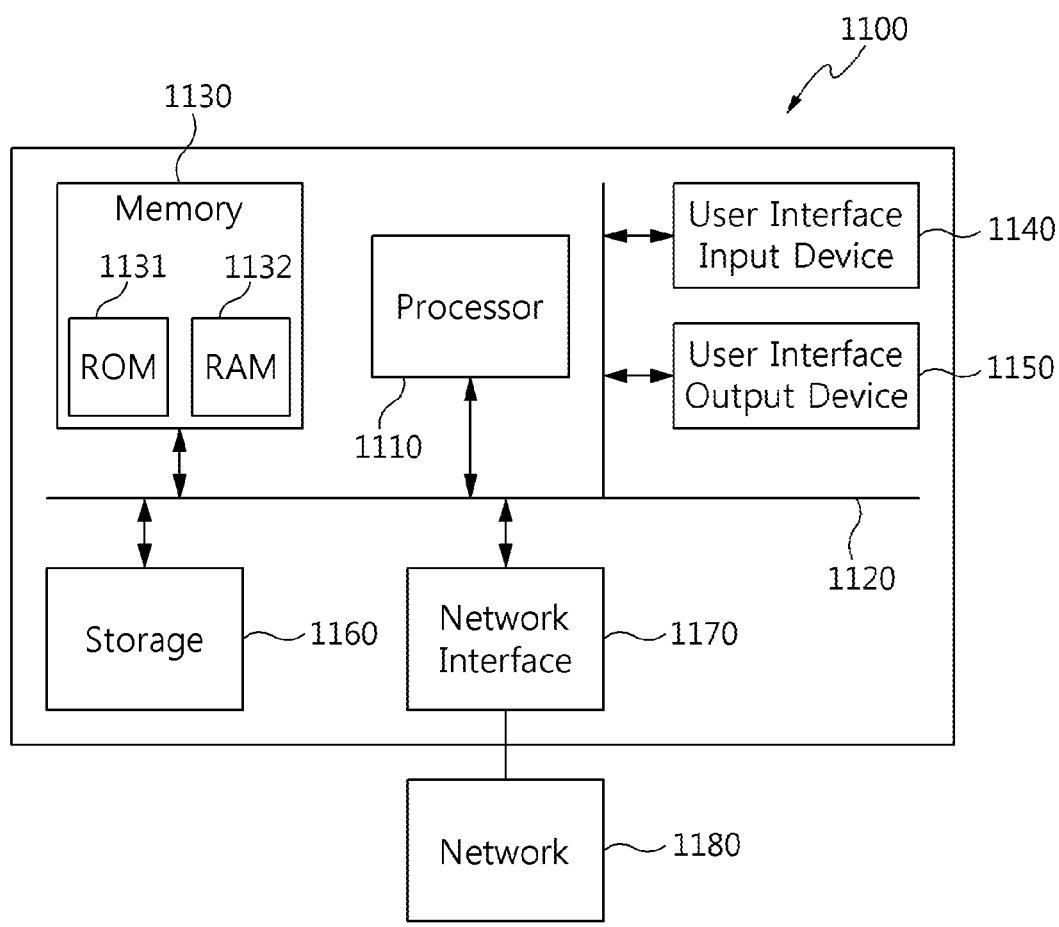
FIG. 9 is a view that shows a computer system according to an embodiment of the present invention.

FIG. 9 is a view that shows a computer system according to an embodiment of the present invention.

Referring to FIG. 9, the apparatus for calibrating an augmented-reality image according to an embodiment of the present invention may be implemented in a computer system 1100 including a computer-readable recording medium. As illustrated in FIG. 9, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

The present invention may provide a realistic augmented-reality image to users.

Also, the present invention may enable a user of an augmented-reality image device to easily calibrate an augmented-reality image.

Also, the present invention may effectively calibrate an augmented-reality image using hand gestures or a simple motion of a user without the use of a special calibration tool.

As described above, the apparatus and method for calibrating an augmented-reality image according to the present invention are not limitedly applied to the configurations and operations of the above-described embodiments, but all or some of the embodiments may be selectively combined and configured, so that the embodiments may be modified in various ways.

What is claimed is:

1. An apparatus for calibrating an augmented-reality image, comprising:
   a camera for capturing an image, measuring 3D information pertaining to the image;
   an augmented-reality image calibrator for generating an augmented-reality image using the image and the 3D information and calibrating the augmented-reality image; and
   a display for displaying the augmented-reality image,
   wherein the camera selects a feature point in the image and extracts 3D coordinates of the feature point, and
   wherein the augmented-reality image calibrator generates a patch that is a predetermined range surrounding the feature point extracted from the image, the patch including a marker line for indicating a position of the feature point.

2. The apparatus of claim 1, wherein the augmented-reality image calibrator displays the image on which the patch is overlaid at an arbitrary position through the display.

3. The apparatus of claim 2, wherein the augmented-reality image calibrator fixes the patch at the arbitrary position and performs a matching process for generating calibration information including 2D coordinates of the patch and 3D coordinates of the feature point when a part of the image overlaps a same part in the patch depending on movement of a user.

4. The apparatus of claim 3, wherein the augmented-reality image calibrator generates multiple patches and performs the matching process for the multiple patches, thereby generating the calibration information.

5. The apparatus of claim 4, wherein the augmented-reality image calibrator calculates a calibration relationship between the 2D coordinates of the patch and the 3D coordinates of the feature point using the calibration information.

6. The apparatus of claim 5, wherein the augmented-reality image calibrator calculates the calibration relationship using the calibration information, a first relationship between a reference coordinate system of the camera and a reference coordinate system of the user, and a second relationship between a reference coordinate system of the display and the reference coordinate system of the user.

7. The apparatus of claim 6, wherein the augmented-reality image calibrator transforms 3D coordinates of a virtual object in a 3D space into the 2D coordinates using the calibration relationship and displays the augmented-reality image including the virtual object through the display.

8. A method for calibrating an augmented-reality image, performed by an apparatus for calibrating the augmented-reality image, the method comprising:
   capturing, by a camera, an image, and measuring, by the camera, 3D information pertaining to the image;
   generating, by an augmented-reality image calibrator, an augmented-reality image using the image and the 3D information, and calibrating, by the augmented-reality image calibrator, the augmented-reality image; and
   displaying, by a display, the augmented-reality image,
   wherein measuring the 3D information comprises selecting a feature point in the image and extracting 3D coordinates of the feature point, and
   wherein calibrating the augmented-reality image comprises generating a patch that is a predetermined range surrounding the feature point extracted from the image, the patch including a marker line for indicating a position of the feature point.

9. The method of claim 8, wherein calibrating the augmented-reality image is configured to display the image on which the patch is overlaid at an arbitrary position through the display.

10. The method of claim 9, wherein calibrating the augmented-reality image is configured to fix the patch at the arbitrary position and perform a matching process for generating calibration information including 2D coordinates of the patch and 3D coordinates of the feature point when a part of the image overlaps a same part in the patch depending on movement of a user.

11. The method of claim 10, wherein calibrating the augmented-reality image is configured to generate multiple patches and perform the matching process for the multiple patches, thereby generating the calibration information.

12. The method of claim 11, wherein calibrating the augmented-reality image is configured to calculate a calibration relationship between the 2D coordinates of the patch and the 3D coordinates of the feature point using the calibration information.

13. The method of claim 12, wherein calibrating the augmented-reality image is configured to calculate the calibration relationship using the calibration information, a first relationship between a reference coordinate system of the camera and a reference coordinate system of the user, and a second relationship between a reference coordinate system of the display and the reference coordinate system of the user.

14. The method of claim 13, wherein calibrating the augmented-reality image is configured to transform 3D coordinates of a virtual object in a 3D space into the 2D coordinates using the calibration relationship and to display the augmented-reality image including the virtual object through the display.

* * * * *